June 12, 1956  E. E. TURNER, JR  2,750,247
POSITION RECORDER

Original Filed June 15, 1943  5 Sheets-Sheet 1

INVENTOR.
EDWIN E. TURNER JR.
BY
HIS ATTORNEY

June 12, 1956

E. E. TURNER, JR 2,750,247

POSITION RECORDER

Original Filed June 15, 1943

INVENTOR.
EDWIN E. TURNER JR.
BY
HIS ATTORNEY

June 12, 1956  E. E. TURNER, JR  2,750,247
POSITION RECORDER
Original Filed June 15, 1943  5 Sheets-Sheet 3

INVENTOR.
EDWIN E. TURNER JR.
BY
HIS ATTORNEY

June 12, 1956     E. E. TURNER, JR     2,750,247
POSITION RECORDER

Original Filed June 15, 1943     5 Sheets-Sheet 4

*INVENTOR.*
EDWIN E. TURNER JR.
BY
HIS ATTORNEY

June 12, 1956     E. E. TURNER, JR     2,750,247
POSITION RECORDER

Original Filed June 15, 1943     5 Sheets—Sheet 5

INVENTOR.
EDWIN E. TURNER, JR.
BY
HIS ATTORNEY

United States Patent Office 2,750,247
Patented June 12, 1956

2,750,247

POSITION RECORDER

Edwin E. Turner, Jr., West Roxbury, Mass., assignor to Raytheon Manufacturing Company, Newton, Mass., a corporation of Delaware Continuation of application Serial No. 571,865, January 8, 1945, which is a division of application Serial No. 490,930, June 15, 1943. This application March 29, 1951, Serial No. 218,151

17 Claims. (Cl. 346—8)

This application is a continuation of my copending application Serial No. 571,865, filed January 8, 1945, now abandoned, which in turn, is a division of application Serial No. 490,930, filed June 15, 1943, now matured into Patent No. 2,418,490, granted April 8, 1947.

The present invention relates to a ranging system principally in the employment of compressional waves and is particularly applicable for plotting the relative position of an unknown object which may be moving and the course of the observing station if that is moving also.

The present invention is applicable for navigation purposes and is particularly useful for military purposes in the art of detecting and following the course of a submarine. For this purpose the invention may employ acoustic energy in the sonic or supersonic range in the subaqueous medium.

One of the chief difficulties encountered in the present echo ranging systems is that considerable time is required to range or search the necessary critical arc in which enemy submarines may lie. When the position and range of the target or obstacle are unknown, not only must a large angle be searched, but also the area for a great depth, necessitating longer intervals between successive rangings in order to permit the sound waves to return from the greatest distance for which the observation is being made. In addition to these factors, the human factor also enters into the picture of sound ranging. Some operators require longer intervals than others to make observations. The fatigue and error are also involved in the human element. An operator is apt, after repeated operations, to lose some of his alertness and not recognize echoes which might indicate the presence of submarines. This is particularly true in sounding systems where reverberations are present and listened to during each ranging signal.

The present system uses as a feature of the invention a plotting arrangement whereby a permanent record is made both of the observing or searching vessel and of the target being observed. This is accomplished in the present invention through the use of a recording sheet in which the position of the observing or search vessel is recorded every time a ranging signal is emitted or the course of the vessel may be continuously traced on the recording paper. The recording paper also carries an indication or record of the position of the target. In accomplishing these results a recording element is moved and turned over the recording paper in a continuous course following the position of the observing vessel. The indicating element at the same time has a member continually directed in the direction from which sound waves are reflected from the object and is also provided with means whereby the distance of the reflecting object is recorded. These results are accomplished by means and methods new in the art of sound ranging and are particularly useful and advantageous in the present system because of the flexibility of the operating elements.

The present system may also employ an amplitude-modulated carrier wave varying over a narrow frequency band in a continuous fashion, whereby the distance measurement is established as a function of the magnitude of the modulating frequency, and the errors in magnitudes of the resultant frequency observed, normally brought about through the Doppler effect because of the motions of the reflecting objects, are reduced.

The present invention has particular advantage when used as an automatic device for automatically searching and plotting the area surrounding the vessel as the vessel moves through the water.

Without further describing the merits and advantages of the present invention, the invention will now be described in connection with an embodiment of the same as illustrated by drawings in which Fig. 1 shows the system in a block diagram;

Figure 1:
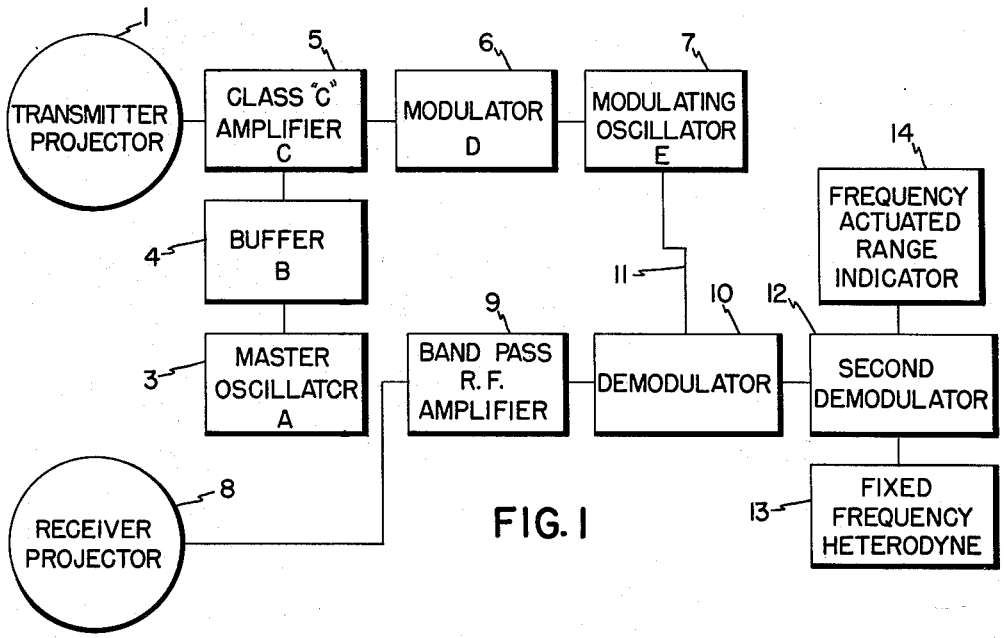
Figure 9:
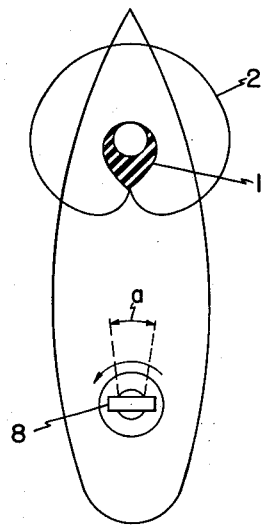
Fig. 9 illustrates diagrammatically the position of the apparatus on a vessel.

In the arrangement shown in Fig. 1, 1 represents the transmitting projector which may be of the supersonic, magnetostrictive, piezoelectric or dynamic type and may produce a compressional wave radiation with a directivity pattern as shown by 2, Fig. 9. The frequency may be of any desired value, as, for instance 12,500 cycles, 20,000 cycles or higher and lower frequencies. A driving circuit, illustrated by the block diagrams in Fig. 1, may be used comprising a master oscillator 3, a buffer amplifier 4 from which the energy is impressed on an amplifier 5 of the class C type, the grid control tube of which may be modulated from a low frequency modulator 6 which may modulate over a range progressively from 100 to 200 cycles. The modulator 6 may be energized through a modulating oscillator 7 whose frequency will be varied in a constant continuous fashion between the desired oscillating frequencies. The result of this combination as applied to the transmitting projector 1 is that the carrier wave, if transmitted, for instance, at 12,500 cycles, will be constantly modulated with a uniform progressive rate over the modulating band. If the band modulates between 100 and 200 cycles, then the higher side band would be 12,600 to 12,700 cycles and the lower side band would be 12,300 to 12,400 cycles, the period between the extreme variations being the cycle of the modulator itself, which may be one second or two seconds or more or less, depending upon the distance range with which the system is to be operated, as will be explained later.

The transmitting projector could be operated continuously or it could be operated for a given time interval and then remain silent. The receiving projector 8, however, may be rotated at a constant rate and be directively sensitive within a small angular opening, in which case the direction in which the receiving projector faces when a reflected sound is picked up will also indicate the direction of the reflecting source. For this purpose the motion of the indicating element, as will be explained later, is synchronized with the facing of the direction of the projector to indicate the direction from which the source of sound has been received.

The receiving projector 8 in the block diagram system of Fig. 1 will impress its reflected wave on a band pass high-frequency amplifier 9 which is connected to a demodulator detector 10 in which the received energy is mixed through the connection 11 from the modulating oscillator with the modulating oscillator frequency. The output of this mixed combination is then demodulated by a second demodulator detector 12 with the aid of a fixed heterodyne oscillator 13 so that the frequency remaining for operating the range indicator 14 is a frequency between 100 to 200 cycles or thereabouts. This frequency may vary from the expected value due to the Doppler effect, as will be presently explained, because of the relative motion of the reflected source and observing station.

Consideration of the operation of the system described will show that the frequency of modulation of the carrier being received by the receiving projector at any instant will in general be different from the frequency of the modulating oscillator 7 at the same instant by a function dependent upon the time required for the energy leaving the transmitting projector to reach the target or reflecting surface and be returned to the receiving projector 8. This frequency difference will be proportional to the distance travelled by the sound in going from the transmitting projector to the receiving projector if the modulating oscillator 7 varies in accordance with a linear function.

For purposes of example, let it be supposed that a maximum range indication of 800 yards is desired. Let it further be assumed that a carrier frequency is fixed at 12,500 cycles per second and that the modulating oscillator 7 generates a frequency varying linearly with time between 100 and 200 cycles in one second, the cycle of operation being assumed to commence at 100 cycles and increase to 200 cycles in one second and then track back to 100 cycles in the following second. Under such conditions, at the beginning of the considered time interval, the upper side band will be 12,600 cycles and the lower side band 12,500 cycles. At the end of the time interval, that is one second later, the upper side band would be 12,700 cycles and the lower side band 12,300 cycles. If a reflecting target is assumed at 800 yards distance and that the speed of sound in water is one second to the target and back for this distance (an assumption that sound travels 4800 feet per second in water, which is approximately correct), then, at the time that the signal is being received, the transmitting projector will be sending into the water the frequencies as indicated for the end of the period as above set forth.

The resultant frequency produced by the second demodulator 12 from the combination above set forth would be, except for the fixed frequency heterodyne oscillator 13, 100 cycles, the difference between the upper or lower side band frequencies which are exactly 100 cycles for the range of 800 yards. For zero distance, it is, of course, obvious that the receiving frequency and transmitting frequencies will be the same and therefore the indication produced by 12 would be a zero beat note. Since it is difficult to work with frequencies approaching zero in an indicating system, the fixed frequency heterodyne 13 is used to raise the resultant beat oscillator signal a constant amount. If the oscillator 13 is fixed at 200 cycles and if the beat difference frequency is used, then the indicator 14 will operate over a range from 100 to 200 cycles, the 200 cycle note being the zero distance measured and the 100 cycle note being the maximum scale reading of 800 yards.

The reason for employing an amplitude-modulated carrier wave rather than varying the frequency of the carrier itself is because the method according to this invention will reduce to insignificance, for substantially all cases, errors of substantial proportions which would be present because of the Doppler effect if the carrier frequency itself were varied. The usual calculation for the Doppler effect indicates that a maximum variation of about 3% of the frequency of the radiated sound may be obtained under worst possible conditions, namely, when the target or object being searched and the attacking or searching vessels are approaching each other in a direct line at maximum speeds.

If a system were used in which the carrier frequency were varied under such conditions, the error due to the Doppler effect may be large for high speeds of the vessels. As an example, if the carrier frequency above assumed, namely, 12,500 cycles, were varied between limits equal to $\pm \frac{1}{2}$ the carrier frequency, that is from 6250 cycles to 18,750 cycles, the error in frequency range, due to the Doppler effect, may be of sufficient magnitude to make the method of observation useless.

The change in frequency due to the Doppler effect in making observations on a moving reflecting source may be determined by the following equation:

$$f^1 = f(1 + 2\frac{(V_1 + V_2)}{a})$$

where $V_1$ and $V_2$ are the velocities, respectively, in the direction of approach of the observing station and the reflecting station to one another and $a$ is the velocity of the sound in the propagating medium. $f$ is the frequency of the sound source and $f'$ is the observed frequency at the receiving station after reflection from the reflecting source. The increase in frequency $f$ is $$\Delta f = (f' - f) = \frac{2f(V_1 + V_2)}{a}$$

If, therefore, the carrier frequency alone is varied, the frequency returning after reflection may differ from the transmitting frequency between values computed on the basis of $f$ being 6250 cycles and 18,750 cycles. Assume, for instance, that the speed of approach of the two vessels is 48 feet per second, which is approximately 30 knots, and that the velocity of sound is 4800 feet per second, then the factor $$2\frac{V_1 + V_2}{a} = .02$$

and $f$ may therefore vary from 125 cycles to 375 cycles in any range measurement. If the same maximum range of 800 yards, as previously set forth, is assumed for the operation of the apparatus which corresponds to one second of time between the sending out of the direct sound and the return of the reflected echo, then the frequency variation on which the basis of distance is measured would be 12,500 cycles, which is the frequency variation during the one second interval. The Doppler error, therefore, for this distance would range between 125 cycles and 375 cycles, the minimum error being 1% and the maximum error being 3%. The chief point to note in the method using a straight carrier frequency variation is that the Doppler error varies as much as 250 cycles for a given condition of vessels' speeds.

In the present system it is to be noted that the frequency being sent out includes the carrier and at least one side band although both may be used. Assume, as previously described, that in the time interval of one second the upper side band varies between 12,600 cycles and 12,700 cycles and that the Doppler factor is .02 as set forth in the illustration where the carrier frequency alone is transmitted. Under these conditions the upper side band Doppler effect may vary between 252 cycles and 254 cycles providing a net variation of two cycles in the entire operation.

If no side band is used, therefore, in the illustrations given, the Doppler effect may cause variations of 125 to 375 cycles while, when using a side band, this same effect is reduced to two cycles. It will be evident, therefore, that if no side band is used, in order to obtain results within the same error of observation that are obtained when a side band is used, the whole carrier frequency magnitude must necessarily be used. In other words, the frequency received must be compared with the frequency transmitted and the total difference measured, which would mean not only a transmitter but also a receiver and an indicator responsive over a 12,500 cycle range rather than over a 100 cycle range, which would make a very difficult construction.

If the carrier were varied in frequency over a narrow range, say from 12,400 to 12,600 cycles, the Doppler effect would vary between 248 and 252 cycles or more than the indicator range. An indicator responsive over a 200 cycle range would then be of no utility.

Figure 3:
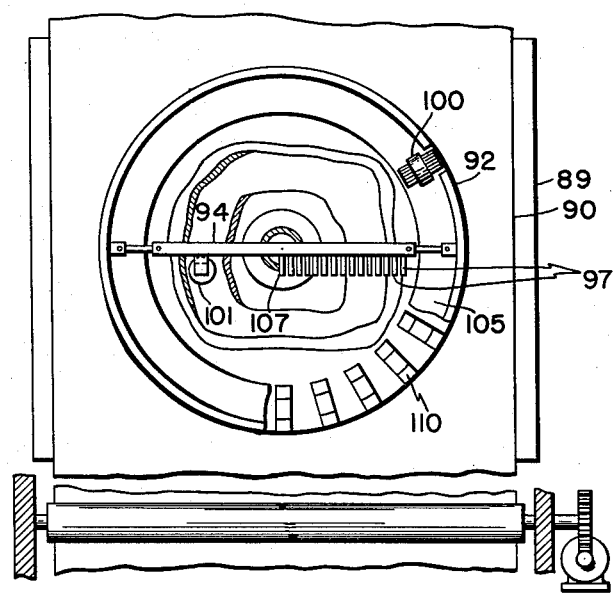
Fig. 3 shows a plan view of a portion of the device indicated in Fig. 2.
Figure 2:
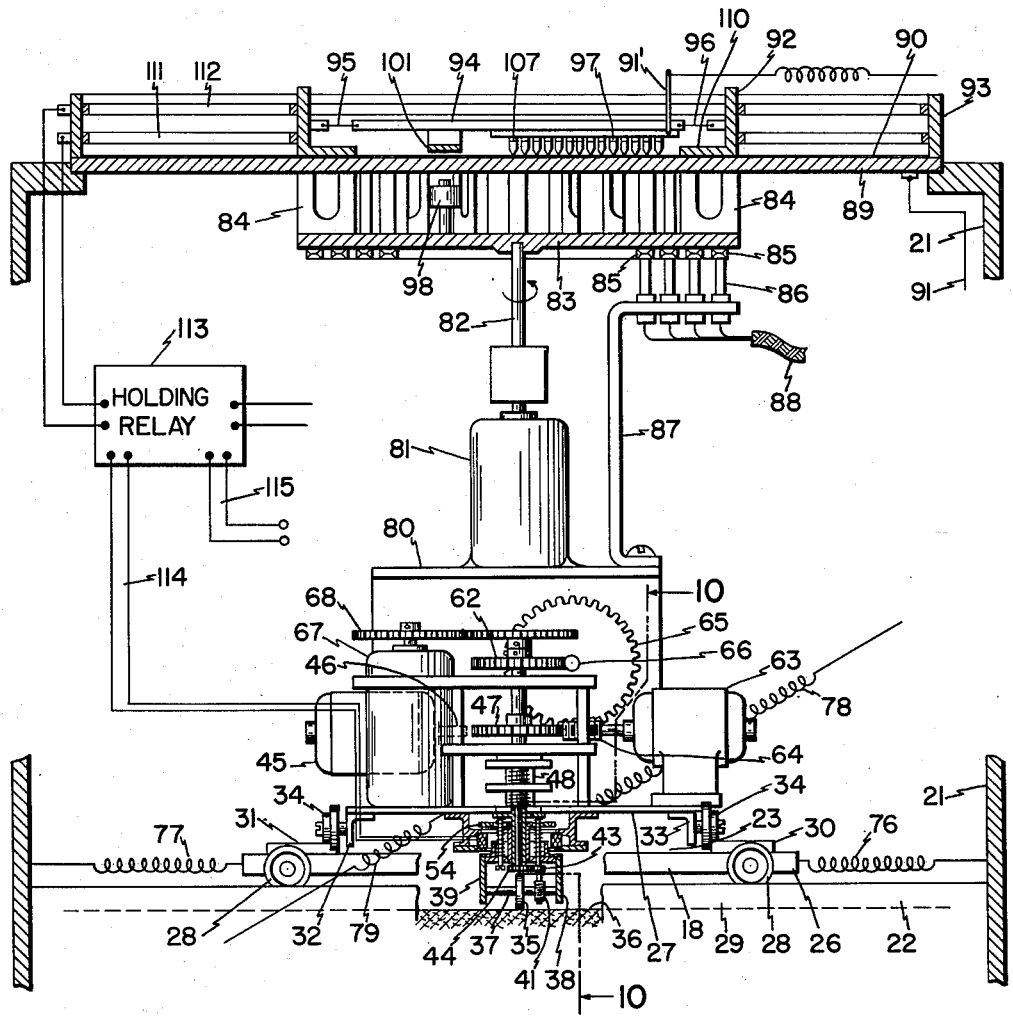
Fig. 2 shows in elevation the indicating system partly in fragmentary section.
Figure 5:
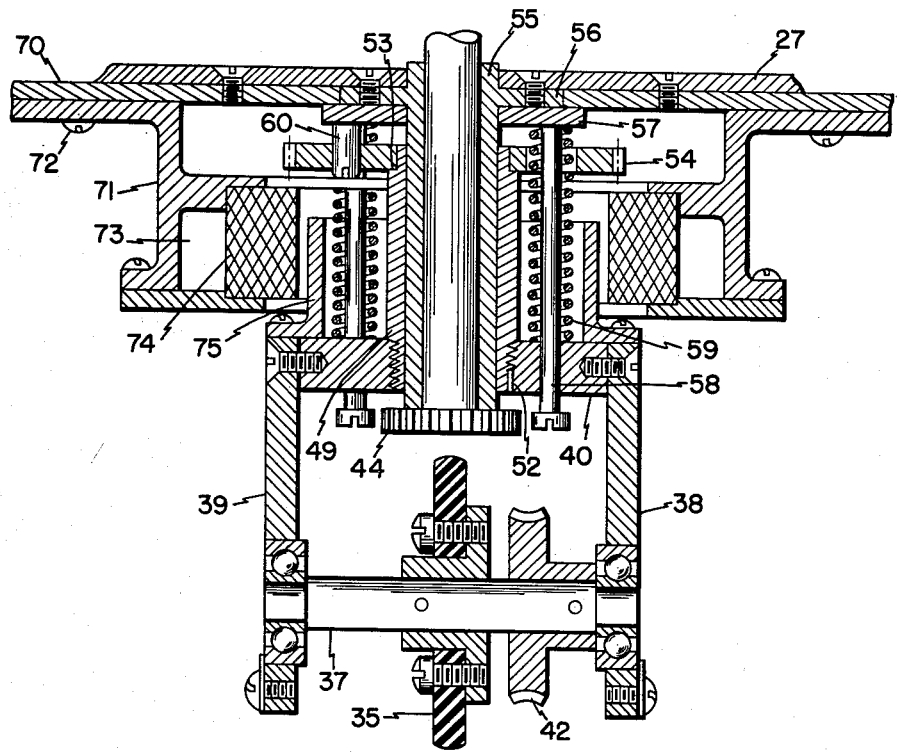
Fig. 5 shows a detail and cross section.
Figure 4:
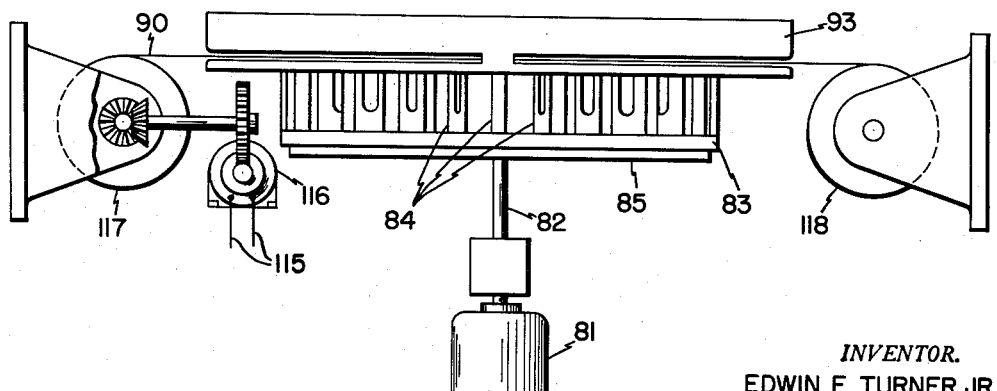
Fig. 4 shows a side view of a part of the device indicated in Fig. 2.

The recording indicating system with the control apparatus for plotting the course of the observing ship and the submarine is illustrated somewhat diagrammatically in Fig. 2 with further details in Figs. 3, 4 and 5.

In Fig. 2 there is provided a frame 21 having a platform 22 provided with a friction bearing surface 36 faced with cork or "corprene" or the like over which the device 23 for simulating the movement of the observing vessel moves, as will be explained later. This device has two independently movable trucks or carriages, a lower one 26, and an upper one 27 which moves on the lower one at right angles to the movement of the lower truck, as will be presently explained. The lower truck 26 is built of two parallel supports 18 on which are mounted four wheels 28 which roll along two parallel guide rails or beams 29 on the lower frame 22.

On the truck 26 there are provided two cross-supports 30 and 31 which bear the upper truck 27. The upper truck 27 is provided with L beams 32 and 33 carrying the truck wheels 34 which move on the supports or guide rails 30 and 31 of the lower truck 26. The wheels 28 and 34 all have flanges bearing against the edges of the guide plates or rails on which they are supported so that the movement of the wheels will always be guided along the edge of the beam supports. It will readily be seen that, since components of motion are provided in two directions at right angles to each other, a variation of velocities will produce motion in any desired direction. The drive is obtained by a single driving wheel 35 which bears against the friction surface 36 with just sufficient pressure for a nonslipping drive without permitting the entire weight of the carriages to rest on the driving wheel 35. This is obtained by permitting the trucks to be supported on the rails and providing spring pressure for forcing the driving wheel 35 down against the friction surface 36. The wheel 35 is mounted on the shaft 37 which is journaled at both ends on supporting brackets 38 and 39 which extend downward from a horizontal plate 40 forming an inverted U-shaped bracket for carrying the driving wheel. The shaft 37 is driven by a worm 41 and a worm wheel 42, see Fig. 5, the latter mounted on the shaft 37. The worm 41 is driven by a gear 43 which, in turn, is driven by the gear 44. The gear 44 is driven by the motor 45 which is run at such a speed of rotation that the drive of the wheel 35 on the friction surface 36 will correspond to the vessel's speed. The motor 45 drives the gear 44 through a worm and worm gear drive 46 and 47, respectively, which drives the shaft 48 on which the gear 44 is mounted. This arrangement is similar to that shown in the copending application of W. G. Gorton et al. Serial No. 483,226, filed April 15, 1943, which matured into Patent No. 2,491,308 on December 13, 1949. The course of the vessel is controlled in the same manner as described in this copending application. In this case the supporting bracket or plate 40 is rotated about a vertical axis to maintain the direction of the driving wheel in the same direction as the heading of the vessel. The plate or bracket 40 is supported for free motion by a sleeve 49 surrounding the shaft 48. This construction, as well as the means for raising the whole U-shaped inverted carriage made up of the elements 38, 39 and 40, is shown more clearly in Figs. 5 and 10.

The plate 40 is threaded to receive the end of the sleeve 49 to which it is pinned in place by a pin 52. At the top end of the sleeve 49 there is provided a shoulder 53 upon which the spur gear 54 is fixed. The sleeve 49 rotates about a second sleeve 55 which surrounds the shaft 48. This sleeve 55 has at its top end an outwardly extending flange 56 by which it is held to the frame of the truck 27. Bearing against the flange 56, but not fixed to it, is a ring 57 which carries three long studs 58 which extend through holes in the plate 40. These studs are each surrounded by springs 59 which exert a pressure between the top of the plate 40 and the bottom of the plate 57 tending to force these two elements apart. The plate 57 is also locked with the gear 54 by means of screws 60 which extend through holes in the disc of the gear 54. The result of this construction is that the springs 59 force the structure carrying the driving wheel 35 downward against the floor 36 and at the same time the shaft 48 drives freely the wheel arrangement previously described. In addition to this, the plate 57 is freely turned by means of the pins 60 engaging the disc of the gear 54 so that the rods 58 maintain their same position with respect to the gear 54. The shaft 37 on which the wheel 35 is journaled will be rotated in a horizontal plane by rotation of the plate 40. Carried by the supporting truck 27 is also a plate 70 to which is attached a bracket 71 by means of screws 72. The bracket 71 carries a frame or spider 73 surrounding the collar 49 which carries the supporting inverted U-shaped member in which the wheel 35 is journaled. This spider carries a solenoid coil 74 and surrounding the collar or sleeve 49 and attached to the top of the plate 40 is a tubular core element 75 of magnetizable material which is adapted to be operated within the solenoid coil 74 so that, when the latter is energized, the armature or core 75 will be lifted upwards against the action of the springs 59. This will raise the wheel 35 from its friction contact with the floor 36 and will permit the two trucks 26 and 27 to be moved freely on the guide rails 29 and 30. The truck 26 is at each end connected to two long helical springs 76 and 77 which, when the wheel 35 is raised, act to center the truck on the floor. Similarly two other springs 78 and 79 are provided for the trucks 27 and these springs act in a similar way to center the truck 27 on the platform or floor when the wheel 35 is raised. The whole mechanism shown in Fig. 2 is therefore returned to the center of the platform.

The control and operation of the coil 74 is obtained through means which will later be described, the purpose of the whole arrangement being to bring the mechanism simulating the searching vessel back to the center of the board after it has gone out to the edge.

The motor 63 controls the direction of heading of the wheel 35. This motor drives the worm reduction system comprising the worm 64, the worm gear 65, and the worm 66 which drives the gear 62. The gear 62 drives a shaft on which is mounted a gear 61 which meshes with gear 54 whereby the direction of heading of wheel 35 is controlled (see Fig. 10). The motor 63 is driven in accordance with the heading of the vessel and if desired a repeater system may be obtained by the use of a repeater motor 67 connected to the gear 62 through the gear 68.

The platform 27 carries a plate 80 on which a motor 81 may be mounted which rotates through a reduction gear or otherwise a shaft 82 which is directed in the same direction as the receiving projector 8 of Fig. 1. The diagrammatic arrangement for this is shown more specifically in Fig. 8 and will be explained later.

The shaft 82 carries a plate 83 on which is mounted annularly on the plate a group of permanent magnets 84 of the horseshoe type. On the underside of the plate 83 there is mounted a group of commutator rings 85 which contact with brushes 86 mounted on the bracket 87 attached to the plate 80 carrying the motor 81 which is of the self-synchronous type. A fixed flexible cable 88 containing the necessary power supply and operating wires connect to the bracket 87 and conduct to the brushes 86 the proper operating currents to operate the recording apparatus situated on the table 89. This table 89 is supported by the frame 21 and preferably is a nonmagnetic conducting plate 89, as for instance, manganese nickel steel, aluminum, copper or the like. The plate 83 with the magnets 84 is positioned so that the magnets are practically but not actually in face contact with the bottom of the plate 89. The table 89 is covered with a recording paper 90 of the type commonly used in depth sounding or echo ranging work. This paper is a conductive paper which becomes black when a current is passed through it between the conducting electrodes, which will be described later, and the conducting plate 89 which serves as an electrode. A wire 91 connected to the bottom of the plate 89 may be used as a ground contact or as a connecting wire to one end of the indicating or receiving circuit.

The paper 90, during any one set of operations of the system, is stationary on the plate 89. However, when the carriage 92 containing the recording elements comes up against the side fences 93, a contact is made which changes the paper, as will be presently described.

The carriage 92 may be circular in shape or it may have any other desired shape such as that of a regular polygon of any number of sides. Spanning the center of the carriage 92 is an electrically-conductive bar 94 which is suspended at its ends by a pair of flexible springs 95 and 96 by means of which it is attached to the side walls of the frame 92. The springs 95 and 96 are mounted horizontally such as to permit the vibration of the bar 94 about a horizontal axis. The bar 94 carries a group of electrically-conductive reeds 97 which are tuned to the desired audio frequencies which in this case may range from 100 to 200 cycles. These reeds are arranged in order with the lower frequencies at one end and the higher frequencies at the other end, depending upon whether the higher frequencies indicate the greater distance or the shorter distance. Either method of recording may be used, as will be noted from the description in the specification. In the example previously given, the audio frequency used for indication ranges from 100 to 200 cycles. A wider or a narrower frequency range may be used if desired. The tuned reeds 97 are energized through the receiving projector 8 in Fig. 1 through which the proper input voltage is finally impressed upon the magnet 98 which vibrates the armature 101 attached to the bar 94. The frequency of vibration of the bar 94 determines which of the reeds 97 is vibrated. The vibrating reed 97 in its increased motional amplitude makes contact with the paper 90 and thereby a current is permitted to flow from the reed across the paper 90 through the plate 89 to the return or ground connection 91. In this arrangement a conducting wire is brought to the reed bank 97 as illustrated by 91'.

Figure 6:
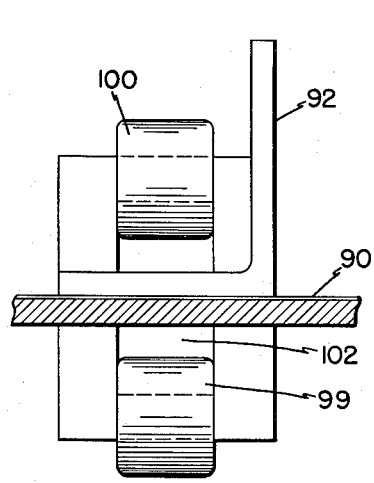
Fig. 6 shows an enlarged detail of a modification.
Figure 7:
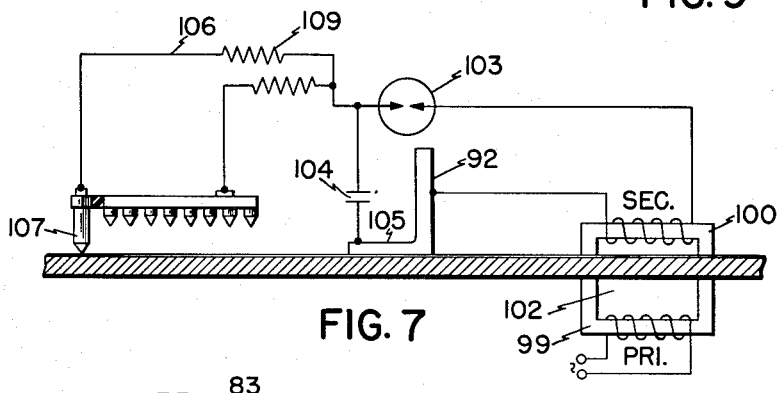
Fig. 7 shows schematically an electrical diagram for the modification of Fig. 6.

Current supply for the marking circuit in another manner is illustrated more clearly in Figs. 3, 6 and 7. This current is supplied through a transformer 102 which has a primary 99 mounted on the plate 83 and situated beneath the plate or table 89 and a secondary 100 positioned above the plate. Alternating high frequency current is supplied to the primary through a pair of the brushes 86 and the secondary 100 is impressed across a cold cathode rectifier circuit comprising the rectifier 103, condenser 104 and the plate element 105 which offers a large surface contact with the recording paper.

The output of this rectifier circuit has a lead 106 going to the center marker 107 for the ship's course and another lead 108 going to the reed bank 97. Current-limiting resistors 109 may be used in the circuit.

The frame 92 and the plate 105 may be joined or made of the same piece of material and, as shown in Figs. 2 and 7, are right angles in sections.

In the ring 105, which is of nonmagnetic material, is arranged a plurality of bar armatures 110 which line up and hold position with the magnets 84. The transformer 102 has its secondary 100 mounted in a fixed position in the enclosed frame 92, as shown in Fig. 3, the secondary being maintained always opposed in position to the primary 99, as indicated in Fig. 6. The actual construction may be as shown in Fig. 6 with the transformer secondary 100 supported by the frame 92 and having its base in contact with the paper 90. The transformer secondary, therefore, will move with the frame 92 while the primary 99 will move with the plate 83. The base 105 of the frame 92, as shown in Fig. 7, is connected to one side of the transformer secondary 100 and the other side is connected through the rectifier to the reed bank 97 and the ship's course marker 107 so that a circuit for supplying current through the paper is made when the reeds come in contact with the paper.

In the arrangement as described, therefore, whenever a projected signal is made on the projector, a mark for the ship's position will be indicated by the current flowing through the stylus 107 at the center of the frame 92. The frame 92, which has a series of armatures 110 spaced around its periphery, is held in exact position by the permanent magnets 84 supported by the plate 83 so that, whatever movement the plate 83 makes either in rotation or in translation, a similar motion is made by the frame 92. The plate 83 is moved beneath the table in direct relation to the motion of the observing vessel. This is accomplished, as has been explained, by drives through the motor 45 which correspond to the vessel's speed and direction through the motor 63 which corresponds to the vessel's heading. In order to return the mechanism to the center of the table and the trucks to the center of the platform, a fence 93 is provided about the periphery of the table with two contact rails 111 and 112 which are connected through contact members on the outside of the frame or fence 92 for the indicating mechanism. When the contact rails 111 and 112 are connected by the frame 92 coming to the border or edge of the table, the relay 113 is actuated, which puts into operation over the lines 114 or energizes the solenoid coil 74, thereby raising the friction wheel 35 off of the floor 36 and permitting the trucks 26 and 27 to roll freely on the guide rails 29, 30, and 31 so as to return the plate 83 and the rest of the mechanism beneath it to the center of the structure.

At the same time that this occurs, the paper feed motor 116 is operated through the line 115, Fig. 4, for a given time interval so that a new stretch of paper is pulled over the plate 89. For this purpose the relay 113 may be a holding relay so that the motor is on for a sufficient time so that the new sheet will be presented on the table. In this way after the carriage or frame 92 has progressed to the edge of the table, it is immediately brought back to the center again on a fresh paper so that observations may continue uninterrupted. The paper feed motor 116 may operate, through a worm drive, a roll 117 which winds the paper from a supply roll 118.

Figure 8:
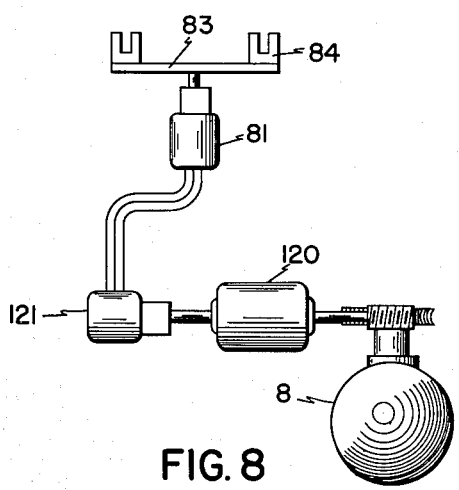
Fig. 8 shows a diagrammatic representation of the system indicating the electrical interconnection of elements.

For the measurement of distance and direction a signal is sent out on the transmitting projector 1. This, in accordance with Fig. 9, is sent out in a pattern illustrated by the curve 2 in which the receiving projector is in a blind spot or dead space for the sound pattern of the projector. The projector 8 may be rotated, as indicated in Fig. 8, by a motor 120 which is a self-synchronous motor 121 (which may be of the Selsyn type) connected to the second self-synchronous motor 81. The motor 81, as indicated diagramatically in Fig. 8, drives the table 83 which has the holding magnets 84 positioned on it. The frame 92 will therefore be rotated and translated in the same manner in which the plate 83 is moved, the bar 94 holding the same direction as the direction in which the receiving projector is faced. When the signal, therefore, excites the receiving projector and operates the proper reed corresponding to the heterodyned frequency, a record will be made by this reed which will be in the direction from the record made by the stylus 107 corresponding to the facing of the receiving projector or the direction in which the projector is sensitive. Therefore, the record made at each instant will be such as to indicate both the distance and the direction of the target from the observed vessel.

The transmitting projector may send out a continuous signal or it may send out a signal for a given time interval and be silent while the receiving projector 8 is rotated. The sensitivity of the receiving beam of the projector 8 is indicated by the angle $a$ of Fig. 9. This may be chosen greater or smaller in accordance with the purpose for which the observations are to be made. As previously explained, the distance will be determined by the specific frequency produced by the frequency actuated range indicator 14 and preferably this frequency will range between 100 to 200 cycles and, in the example explained, zero distance will be measured by the 200 cycle note and the maximum range by the 100 cycle note.

Figures 10, 11:
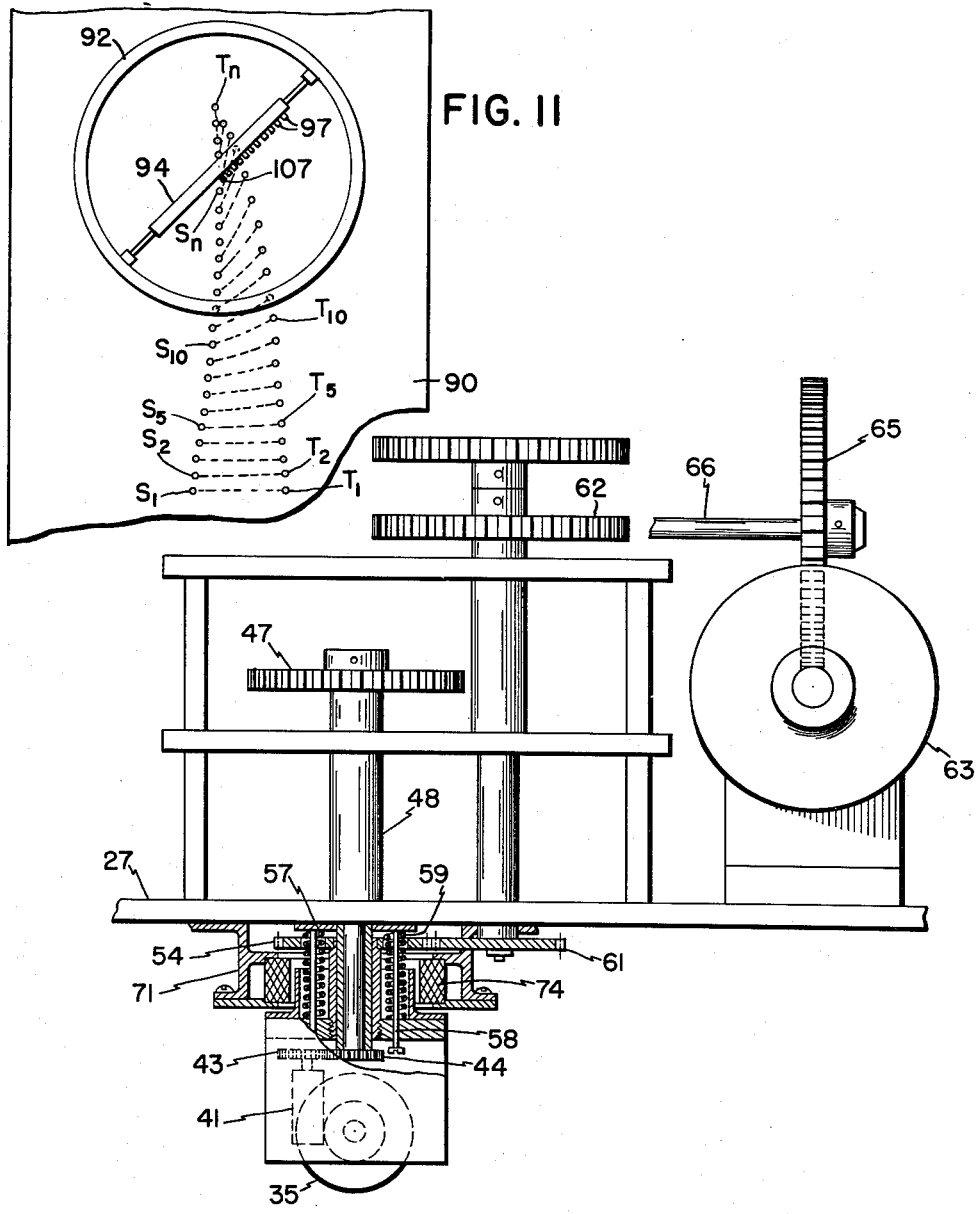
Fig. 10 shows in elevation and partly in fragmentary section a portion of the indicating system shown in Figs. 2 and 5, the section being taken at right angles to the sections in Figs. 2 and 5.
Fig. 11 shows a sample record of an actual recording made by the apparatus.

Fig. 11 shows a sample record of a hypothetical event, and the manner in which it is made. The frame 92 moves over the paper 90, with the stylus 107 tracing a replica of the course of the ship over the paper. Regularly, each time a signal is sent out, the stylus marks the paper, making a dot-like mark $S_1, S_2 \ldots S_5, \ldots S_{10}, \ldots S_n$. These marks delineate the course of the ship, and are spaced apart in accordance with the speed of the ship. In this hypothetical event, it is assumed that, at the time the stylus 107 was at $S_1$, a target was detected at $T_1$. This target was on the beam, at a relative bearing 090 degrees. The frame 92 was automatically oriented to direct the bar 94 in the proper direction on the paper 90 and the correct reed 97 marked the dot $T_1$ on the paper. A dotted line between dots $S_1$ and $T_1$ relates these two corresponding dots together in the figure. Subsequently, when the stylus 107 was at $S_2$, another fix $T_2$ on the target relative to the ship was recorded. This process continued, with a record of the relative bearing and range of the target being made for each record of the ship's position, up to and including $T_n$ for $S_n$. It is apparent after very few recordings that the relative bearing angle of the target is becoming smaller, indicating that the target is moving and drawing forward of the observing ship. This much information is available from prior known systems wherein observations are made of a target with reference to a fixed point representing the observing station or ship. From such observation and a knowledge of the observing ship's course and speed, the target's course and speed can be calculated. The present record differs in that it provides directly the information about the target's course and speed. The line traced out by the target dots $T_1 \ldots T_n$ is the target's course. Measurement of the lengths of both lines for equal times provides relative speed information. It may be here noted that the last target dot $T_n$ was made when the stylus was on $S_n$ and the bar 94 was directed just about dead ahead.

What is claimed is:

1. In a wave reflection object detection system located at a moving observing station and having a wave transmitter and a wave receiver at least one of which is directive and orientable to aim its directive characteristic as desired, and position recording mechanism; said recording mechanism comprising: a table having a marking surface thereon; a unitary frame smaller than said marking surface positioned over said marking surface; elongated means carried on said frame, said elongated means holding a plurality of mark producing means including means for producing a first mark corresponding to the position of said station in response to operation of said transmitter; and means for producing a second mark in response to operation of said receiver at a distance along said elongated means from said first mark corresponding to the distance from said station to a detected object; means for orienting said frame about an axis perpendicular to said table to direct said elongated means in synchronism with the directive member at said station; and means for moving said frame over said table in accordance with the course of said observing station, with said means for producing said first mark tracing a replica of said course over said table.

2. In a wave reflection object detection system located at a moving observing station and having a wave transmitter and a wave receiver at least one of which is directive and orientable to aim its directive characteristic as desired, and position recording mechanism; said recording mechanism comprising: an electrically conductive table; a recording paper thereon, of the electrically conductive kind which is marked by the passage of electric current; a unitary frame smaller than said table positioned over said paper; elongated means carried on said frame, said elongated means holding a plurality of electrically conductive means in a line over said paper; means for operating a first of said conductive means to contact said paper and produce a first mark corresponding to the position of said station in response to operation of said transmitter; means for operating a second of said conductive means to contract said paper and produce a second mark at a distance along said line corresponding to the distance from said station to a detected object; means for orienting said frame about an axis perpendicular to said table to direct said line in synchronism with the directive member at said station; and means for moving said frame over said paper in accordance with the course of said observing station, with said first conductive means tracing a replica of said course over said table.

3. A system as claimed in claim 2 wherein said conductive means are each a reed having a particular resonant frequency corresponding to a particular distance, and having means for vibrating said elongated means at the frequency of the reed measuring said distance.

4. In an object detection system located at a moving observing station and having a search member which is directive and orientable to aim its directive characteristic as desired, and position recording mechanism; said recording mechanism comprising: a table having a marking surface thereon; a unitary frame smaller than said marking surface positioned over said marking surface and carrying distance measuring means; said distance measuring means arranged to measure distances along a line starting at a point in said frame; means to orient said frame with respect to said surface to direct said line in synchronism with the directive member at said station; and means to move said frame over said surface in accordance with the course of said observing station, with said point tracing a replica of said course over the table; said distance measuring means marking said surface at said point and at a position along said line corresponding to the distance from said station to a detected object at which said directive member is aimed.

5. A system as claimed in claim 4 wherein: said frame is provided with a plurality of fixedly mounted magnetizable armatures, and having magnetic means carried beneath the table for moving said magnetizable armatures and with them said frame over said marking surface, whereby the orienting and moving of said frame can be accomplished through said magnetic means.

6. In an object detection system located at a moving observing station and having position recording mechanism; said recording mechanism comprising: a table having a marking surface thereon; a unitary frame smaller than said marking surface positioned over said marking surface and carrying distance measuring means, said distance measuring means marking said surface to produce a record of distances measured; means for moving said frame over said surface in accordance with the course of the observing station; means actuated when said frame approaches the edge of the table for disengaging said moving means; and means for returning said frame substantially to the center of said table.

7. A system as claimed in claim 6 wherein, means is provided for replacing the marking surface with a new marking surface section each time said moving means is disengaged, whereby only one record of distances traced appears in each section of marking surface.

8. In an object detection system located at a moving observing station and having position recording mechanism; said recording mechanism comprising: a table having a marking surface thereon; a unitary frame smaller than said marking surface positioned over said marking surface and carrying distance measuring means; said distance measuring means marking said surface to produce a record of distances measured; means for moving said frame over said surface in accordance with the course of the observing station; means actuated when said frame approaches the edge of the table for disengaging said moving means and simultaneously providing a new marking surface; and means for returning said frame substantially to the center of said table.

9. In an object detection system located at a moving observing station and having position recording mechanism; said recording mechanism comprising: a table; a marking paper strip with means for feeding the strip over the surface of the table; said paper providing a marking surface on said table; a unitary frame smaller than said marking surface positioned over said marking surface and carrying distance measuring means, said distance measuring means marking said surface to produce a record of distances measured; means for moving said frame over said marking surface in accordance with the course of the observing station; means actuated when said frame approaches the edge of the table for disengaging said moving means and simultaneously providing a new section of the paper strip on the table; and means for returning the frame substantially to the center of the table.

10. In an object detection system located at a moving observing station and having position recording mechanism; said recording mechanism comprising: a table having a marking surface thereon; a unitary frame smaller than said marking surface positioned over said marking surface and carrying distance measuring means; said distance measuring means marking said surface to produce a record of distances measured; means for moving said frame over said surface in accordance with the course of the observing station, said moving means comprising: operating means positioned beneath the table and coupled to said frame; a bearing platform; said operating means including motive sources operated in synchronism and in proportional relation to the course and speed of said observing station; a friction wheel in engagement with said platform and movable by said motive sources thereover; spring means having one set of ends fixed and the other set attached to said motive source; and means actuated upon the frame approaching the edge of the table to release the engagement of said wheel with said platform, whereby said springs return said motive source and hence said frame to a position corresponding substantially to the center of said table.

11. In an echo ranging system, located at a moving observation station, of the type wherein the distance of a remote object is determined by the time interval between energy transmitted toward said object from a rotatable energy radiation system and return energy, a recording medium having a flat surface, a bar member, means to rotate said bar member about a first point thereof in a plane parallel to the surface of said medium, means to cause the position of said bar member to correspond continuously with the orientation of said radiating system, means responsive to said return energy to mark said medium at a second point corresponding to the position of said bar member and having distance from said first point determined by the distance of said remote object, means for returning said bar member to a position adjacent said first point, and means responsive to arrival of said bar member at a predetermined position for rendering said returning means effective.

12. In an echo ranging system, located at a moving observation station, of the type wherein the distance of a remote object is determined by the time interval between energy transmitted toward said object from a rotatable energy radiation system and return energy, a recording medium having a flat surface, an elongated member, means to rotate said elongated member about a first point thereof in a plane parallel to the surface of said medium, means to cause the position of said elongated member to correspond continuously with the orientation of said radiation system, means responsive to said return energy to mark said medium at a second point corresponding to the position of said elongated member and having distance from said first point determined by the distance of said remote object, means for returning said elongated member to a position adjacent said first point, and means responsive to the arrival of said elongated member at a predetermined position for rendering said returning means effective.

13. In a pulse-echo system, located at a moving observation station, of the type wherein the distance of a remote object is determined by the time interval between pulses transmitted toward said object from a rotatable antenna system and return energy pulses, a recording medium having a flat surface, a bar member, means to rotate said bar member about one end in a plane parallel to the surface of said medium, means to cause the position of said bar to correspond continuously with the orientation of said antenna system, means responsive to said pulses to mark said medium at a point corresponding to the position of said bar and having distance from said end thereof determined by the distance of said remote object, means constantly urging said bar member to a starting position, restraining means normally rendering said urging means ineffective, and means responsive to the arrival of said bar member at a predetermined position for withdrawing said restraining means.

14. In an echo ranging system, located at a moving observation station, of the type wherein the distance of a remote object is determined by the time interval between energy transmitted toward said object from a rotatable energy radiation system and return energy, a recording medium having a flat surface, an elongated member, means to rotate said elongated member about a first point thereof in a plane parallel to the surface of said medium, means to cause the position of said elongated member to correspond continuously with the orientation of said radiation system, means responsive to said return energy to mark said medium at a second point corresponding to the position of said elongated member and having distance from said first point determined by the distance of said remote object, means constantly urging said elongated member to an initial position, friction means normally rendering said urging means ineffective, and electrical switching means controlling withdrawal of said friction means.

15. In an echo ranging system, located at a moving observation station, of the type wherein the distance of a remote object is determined by the time interval between energy transmitted toward said object from a rotatable energy radiation system and return energy, a recording medium having a flat surface, an elongated member, means to rotate said elongated member about a first point thereof in a plane parallel to the surface of said medium, means to cause the position of said elongated member to correspond continuously with the orientation of said radiation system, means responsive to said return energy to mark said medium at a second point corresponding to the position of said elongated member and having distance from said first point determined by the distance of said remote object, means constantly urging said elongated member to an initial position, restraining means opposing said urging means, and electro-magnetic means for withdrawing said restraining means.

16. A marking system comprising a recording medium having a flat surface, an elongated member, means to rotate said elongated member about a first point thereof in a plane parallel to the surface of said medium, means mounted on said elongated member at said first point to mark said medium, means mounted on said elongated member to mark said medium at a second point having distance from said first point corresponding to an observed phenomenon, means to control the direction of said elongated member in accordance with a second characteristic of said observed phenomenon, means for returning said elongated member to an initial position, and electrically operable means, responsive to arrival of said elongated member at a predetermined position for rendering said returning means effective.

17. A marking system comprising a recording medium having a flat surface, an elongated member having marking means at one end thereof, means to rotate said elongated member about said end in a plane parallel to said surface, means mounted on said elongated member to mark said medium at a second point having distance from said first point corresponding to a characteristic of an observed phenomenon, means to control the direction of said elongated member in accordance with an additional characteristic of said observed phenomenon, resilient means constantly urging said elongated member toward an initial position, means opposing said resilient means, and electrically operable means for disabling said opposing means.

References Cited in the file of this patent

UNITED STATES PATENTS

| 1,084,907 | Spalazzi | Jan. 20, 1914 |
| 1,123,795 | Pollen | Jan. 5, 1915 |
| 1,293,747 | Ford | Feb. 11, 1919 |
| 1,746,420 | Fung | Feb. 11, 1930 |
| 1,958,909 | Chappell et al. | May 15, 1934 |
| 2,437,243 | Curtis | Mar. 9, 1948 |
| 2,467,202 | Gardiner | Apr. 12, 1949 |
| 2,516,389 | Hurvitz | July 25, 1950 |
| 2,534,820 | Hurvitz | Dec. 19, 1950 |
| 2,561,345 | Deloraine | July 24, 1951 |

FOREIGN PATENTS

| 384,971 | Great Britain | Mar. 6, 1931 |